Oct. 24, 1961 D. C. WENDELL, JR 3,005,977

BISTABLE STATE MAGNETIC ELEMENTS AND COUPLED CIRCUITRY

Filed Sept. 13, 1955 2 Sheets-Sheet 1

INVENTOR.
DOUGLAS C. WENDELL, JR.

BY Harris A. Mumma Jr.

ATTORNEY

Oct. 24, 1961 D. C. WENDELL, JR 3,005,977

BISTABLE STATE MAGNETIC ELEMENTS AND COUPLED CIRCUITRY

Filed Sept. 13, 1955 2 Sheets-Sheet 2

INVENTOR.
DOUGLAS C. WENDELL, JR.

BY Harris A. Mummah Jr.

ATTORNEY 3,005,977
Patented Oct. 24, 1961

3,005,977

BISTABLE STATE MAGNETIC ELEMENTS AND COUPLED CIRCUITRY

Douglas C. Wendell, Jr., Berwyn, Pa., assignor to Burroughs Corporation, Detroit, Mich., a corporation of Michigan Filed Sept. 13, 1955, Ser. No. 533,987
25 Claims. (Cl. 340—174)

This invention relates to bistable state magnetic storage elements, which ordinarily involve a plurality of read-in and read-out conductors, giving them the attributes of coupled circuit magnetic elements, and generally to coupled circuit magnetic elements having the mechanical and structural features of the bistable elements of the invention, providing close electromagnetic coupling. The invention further is concerned with certain types of magnetic memory matrices in which these bistable state storage elements have special utility.

In forming devices such as inductance elements, transformers, and magnetic storage elements it is customary to prepare one or more coils by winding numerous turns of wire upon an insulating form, after which a leg of the magnetic circuit is slipped through this coil assembly and joined to the remainder of the magnetic circuit by some means which avoids excessive air gap therein. The magnetic circuit may be made up, for example, of a stack of laminations, or it may be made of a wound strip, or a coherent body of compressed small particles, the wound strip or body being cut open or otherwise made in two pieces which are joined together after assembly into the coil structure. Alternatively, the magnetic core structure may be formed first by winding magnetic strip in a continuous loop or by compacting a toroid of magnetic powder, after which special coil-winding machines are used to fabricate a coil around the open-centered core so that each turn of the coil passes through the center of the core. Toroidal cores of coherent particles also have been coupled to electric circuits by passing a number of small wires very loosely through the center of the toroid. Magnetic elements of these types may be quite useful as reactors, transformers, or memory elements; however, such methods of construction involve either a bulky coil structure or one quite difficult to fabricate, or else involve a very tedious threading operation to place the conductors within the core. In many cases the practice of winding either core or coils upon a form or otherwise prefabricated a toroidal core may give a satisfactory element, but such elements nevertheless miss by far the achievement of the most compact possible electromagnetic element.

Another form of electromagnetic circuit element old in the art is the continuously loaded submarine telegraph or telephone cable. Such a cable may be loaded inductively by providing a central conductor with a helical serving of a magnetic alloy. Ordinarily the pitch of the helix is equal to the width of the alloy strip so that the helix lies flat in one thickness, although two servings may be employed, one over the other. This arrangement provides a single conductor closely coupled to the magnetic covering upon it, but does not provide such close coupling of a plurality of insulated conductors to the same magnetic circuit, nor is the magnetic circuit ever equipped to operate anywhere but in its unsaturated linear range, which is the only range useful for communication purposes.

It is an object of this invention, therefore, to provide a new and improved coupled circuit magnetic element of the bistable state magnetic storage type which avoids one or more of the disadvantages of the prior art elements.

It is another object of the invention to provide a new and improved coupled circuit magnetic element which furnishes close electromagnetic coupling between a plurality of uncoiled conductors and a single magnetic circuit.

It is a further object of the invention to provide a new and improved bistable state magnetic storage element which has a structure permitting easy manufacture at low expense and which provides close coupling between the read-in or read-out conductor or conductors and the magnetic circuit.

It is still another object of the invention to provide a new and improved magnetic memory matrix distinguished by simplicity of structure and ease of manufacture and assembly.

In accordance with the invention, a coupled circuit magnetic device or element comprises a plurality of elongated electrical conductors, insulated from each other by nonconductive coatings thereon, and disposed substantially straight and parallel for a portion of their lengths in a compact bundle substantially free of nonconductive spaces except for any gaps made unavoidable by conductor cross-sectional shape and by the coatings on the conductors; and a strip-shaped length of ferromagnetic material extending in wound conformation for more than one turn continuously and closely around, and directly on, that bundle of insulated conductors.

In accordance with another feature of the invention, a bistable state magnetic storage device or element comprises a plurality of such mutually insulated conductors likewise disposed for a portion of their lengths in a compact bundle in which each insulated conductor lies throughout that portion of its length substantially in contact with the conductors nearest thereto in the bundle; and a strip-shaped length of ferromagnetic material which is similarly disposed in wound conformation around the bundle, and which has in such wound conformation a magnetic field-magnetic flux hysteresis loop characteristic with two well defined, relatively flat, retentive flux-storing regions, each separated by a well defined, relatively steep flux-switching region, and preferably having an essentially square magnetic hysteresis loop characteristic.

In accordance with a related feature of the invention, the bistable state magnetic storage device comprises an electrical conductor unit disposed substantially straight for a predetermined length and consisting within such length of at least one conductor such as a flexible wire; and comprises further a length of ferromagnetic material, having the aforementioned magnetic hysteresis loop characteristic and exhibiting a strip-shaped configuration, which extends continuously and closely around the substantially straight portion of the conductor unit for a distance substantially longer than the periphery of the conductor unit; this conductor unit is compact and substantially free of nonconductive spaces except for any unavoidable gaps between contiguous conductors, where there is more than one conductor, and except for any insulating coatings which may be present thereon; the length of ferromagnetic material is supported by, and lies closely adjacent to, a substantial portion of the surface of each such conductor which occupies a peripheral position in the conductor unit; and means, coupled to at least one conductor therein, is provided for effecting magnetic saturation in the ferromagnetic material.

In accordance with an additional feature of the invention, an electrical circuit matrix, including a plurality of magnetic element stations at coordinate positions in the matrix, comprises a network of elongated electrical conductors gathered together in compact bundles at those coordinate positions, the conductors in each of the bundles constituting a distinctive combination, being mutually insulated by nonconductive coatings on the conductors, and being disposed substantially free of nonconductive spaces within the bundle except for any gaps made unavoidable by conductor cross-sectional shape and by the insulating coatings on the conductors; and the matrix further comprises for each of the bundles of conductors an individual, strip-shaped length of ferromagnetic material which extends in wound conformation for more than one turn continuously and closely around, and directly on, the respective bundle of conductors. In a preferred form such a matrix constitutes a magnetic memory matrix in which each such length of ferromagnetic material has in its wound conformation a bistable state magnetic hysteresis loop characteristic.

For a better understanding of the present invention, together with other and further objects thereof, reference is had to the following description taken in connection with the accompanying drawings, and its scope will be pointed out in the appended claims.

Figures 1, 6:
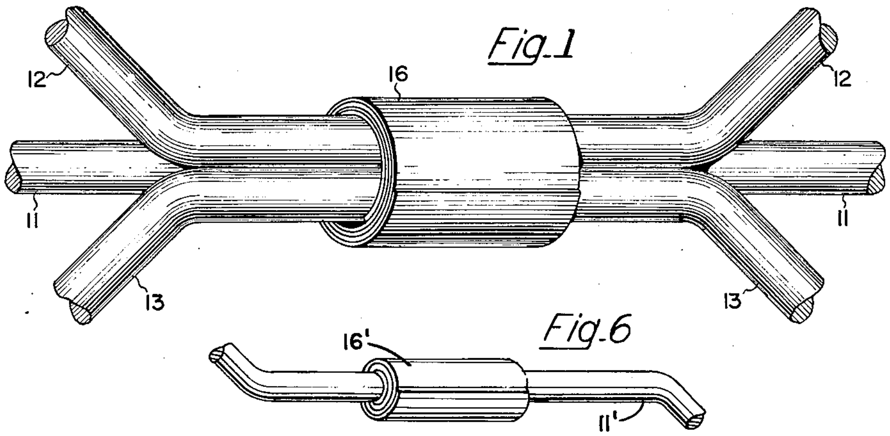
FIG. 1 is an enlarged perspective view of a coupled circuit magnetic element constituting a bistable state magnetic storage element embodying the invention.
Figure 5:
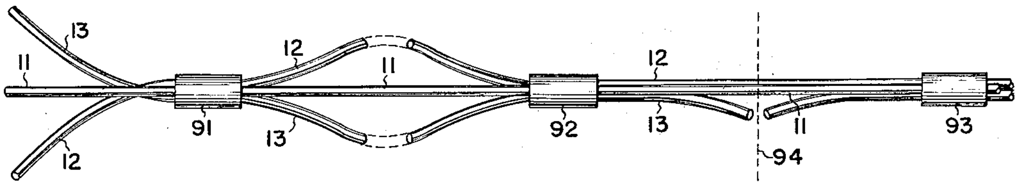
Figure 4:
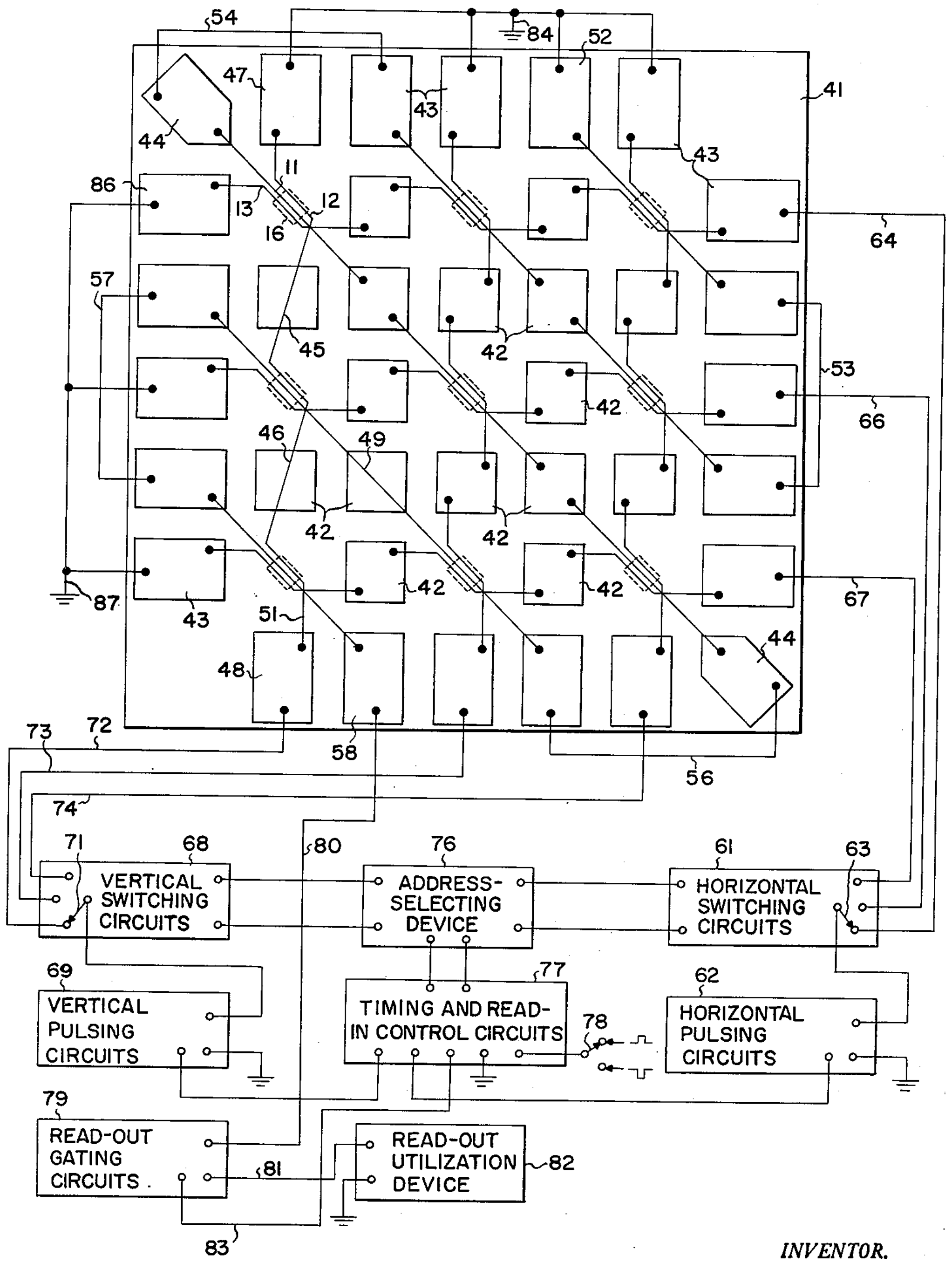

FIG. 4 is a plan view, partly in schematic and block diagram form, of a magnetic memory matrix including a number of such magnetic elements, including in block form the associated circuit equipment for effecting the read-in and read-out operations; and FIG. 5 is a plan view of several magnetic elements as fabricated; and FIG. 6 is an enlarged perspective view of a modification of the magnetic device illustrated in FIG. 1, the element represented in FIG. 6 being a bistable state magnetic storage device having a simplified conductor arrangement utilizing a single wire.

Referring now to FIG. 1, there is illustrated in a modified perspective view a coupled circuit magnetic element preferably having the characteristics of a bistable state magnetic storage element and including an electrical conductor unit which is made up of at least one conductor and which is arranged compactly for a portion of the length of the unit. This conductor unit might be made up of a single conductor; in any case excessive kinking of the conductor or conductors should be avoided so as to provide a compact arrangement over which a magnetic core may be assembled closely and preferably contiguously in the manner discussed hereinbelow. A bistable magnetic element as described hereinbelow but having only a single coil or conductor can be used for information storage purposes, read-out being effected through the same coil or conductor used for switching the core of the element. However, it is preferred to provide a conductor unit suitable for accommodation of the circuit arrangements conventionally found in coincident current magnetic memory matrices employing many magnetic elements, in which case at least two coincident current coils and one read-out or sensing coil usually are provided for each core.

Thus, in tis preferred form as illustrated in FIG. 1, the bistable state element is a coupled circuit magnetic element comprising a conductor unit made up of a plurality of elongated, mutually insulated electrical conductors 11, 12, and 13 extending substantially straight and parallel for a portion of their lengths in a compact bundle. Each of these conductors is surrounded by a nonconductive coating or film of insulating material, not shown in FIG. 1 but indicated at 14 on each conductor in FIG. 2. The films 14 may be, for example, the ordinary enamel or plastic coating provided on wire used in winding coils. Since these conductors are not separate turns of a single winding but instead are individually insulated and electrically distinct from each other, each one is suitable for connection in a separate electrical circuit. It may be desired to include fewer or more than three conductors, and in some cases two of these conductors might be in the same circuit, forming in effect a single conductor, but in any case at least two of the conductors arranged in the compact bundle are insulated from each other whenever it is desired to have in the conductor unit two separate circuits coupled to the same magnetic core.

A sleeve 16 of a thin strip of ferromagnetic material is wound compactly for more than one turn on the compact bundle of conductors 11, 12, and 13 making up the conductor unit. The sleeve 16 surrounds the bundle of conductors along at least part of the compact straight portion thereof. While the ferromagnetic strip might be wound helically, a magnetic circuit of lower reluctance ordinarily is obtained by winding spirally, each turn over the preceding one, so that only a very small effective air gap is obtained where the magnetic circuit is compacted from one turn to the next.

With this arrangement of the magnetic sleeve wound on the compactly arranged portion of the length of the conductor unit, each of the conductors 11, 12, and 13 protrudes from opposite end portions of the sleeve 16, and the corresponding ends of at least two of the mutually insulated conductors, and of all three of them in the FIG. 1 arrangement, are separated and spaced apart from each other at the end of the compact straight portion of the conductor unit. Thus the conductors are available for external connections individually into a plurality of circuits, as will be illustrated hereinbelow in connection with the arrangement shown in FIG. 4. The separation of the conductors by bending two of them at both ends of the compact straight portion may be observed in the view of FIG. 1.

Figure 2:
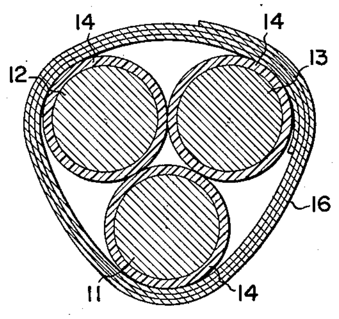
FIG. 2 is a cross-sectional view taken transversely through the center of the element depicted in FIG. 1.

A typical compact arrangement of the conductor unit and the sleeve 16 is illustrated in FIG. 2. When the conventional round wire conductors are used, it is unavoidable that spaces exist between the wires even though substantially contiguous, and with wires of small diameter even the thinnest possible insulation layers 14 often take up a substantial portion of the cross-sectional area. However, it should be noted in FIG. 2 that the metallic wires 11, 12, and 13 nevertheless account for a large fraction, of the order of half, of the area within the magnetic core 16. The construction of the element will be seen to give the most compact assembly of separate circuit conductors possible without resorting to unusual, and hence expensive, conductor shapes and sizes and insulating techniques. When there are many conductors, closer packing may be obtained with conventional circular-section conductors by making some of the wires of relatively smaller diameter, so that they fit in the spaces between the other wires. Ordinarily, however, the improvement in operation obtainable in this way does not justify the additional care needed to assemble the conductors in the required closely packed relationships. Thus substantial deviations are permissible from the most compact arrangement possible, while nevertheless keeping the bundles of conductors substantially free of nonconductive spaces, except for the aforementioned gaps made unavoidable by conductor cross-sectional shape and by the insulating coatings on the conductors, and thus quite compact; this may be accomplished, of course, by arranging the bundle of conductors within the magnetic core so that, throughout the length of the bundle, each insulated conductor lies substantially in contact with the conductors nearest thereto in the bundle. One alternative arrangement of the wires involves twisting the conductors together moderately, and this often facilitates assembly since the wires do not tend to separate from each other where they are bundled and twisted together along the straight portion of the conductor unit. The wires are considered to be substantially straight, parallel and compactly arranged even though twisted around each other moderately tightly.

In one example of a magnetic element of the type illustrated in FIGS. 1 and 2, the individual wires 11, 12, and 13 were lengths of conventional flexible coil-winding wire having a diameter of about 0.006 inch with insulating coatings about 0.0005 inch thick. The strip or tape of ferromagnetic material was approximately 0.000125 inch thick and was wound spirally for between about five and ten laps around the three wire conductor unit. With elements of the dimensions given above the sleeve portion has a maximum over-all diameter of about 0.020 inch and conveniently has a length of about 0.125 inch, while the wires may extend, say a half inch from each end of the sleeve. Although the wound strip should form a sleeve which fits quite snugly around the conductors, the fragility of such thin strips makes it undesirable to exert during the fabrication of the sleeve sufficient tensions or pressures to make the sleeve adhere very closely to the contours of the conductor unit, and very desirable operating characteristics can be obtained without extremely tight winding. Accordingly, minor bulges and wrinkles in the sleeve are permissible. A thin, tightly applied serving of a thin, tough insulating tape directly over the wires and under the magnetic sleeve may be desirable in some cases for mechanical and electrical protection of the wires and core. It is evident, though, that the sleeve-like portion 16 effectively constitutes a length of ferromagnetic material which exhibits a strip-shaped configuration and which extends continuously and closely around the conductor unit as a contiguous layer or serving for a distance substantially longer than the periphery thereof. Preferably the sleeve portion is constituted by a strip wound around the periphery of the conductor unit for the specified distance, thus making more than one turn as in a spiral. The strip-shaped length is supported by, and lies closely adjacent to, a substantial portion of the surface of each of the insulated conductors which occupies a peripheral position in the conductor unit, as may be seen in FIGS. 1, 2, and 6 of the drawings where the number of conductors shown is small enough that each one occupies a peripheral position. In other words, the core strip extends in wound conformation continuously and closely around, and directly on, the conductor unit.

Nevertheless, in spite of the deviations from perfect compactness which are permissible in both the conductor unit and the sleeve, it will be appreciated that an extremely compact arrangement of the conductor and of the magnetic circuit arranged in close proximity thereto is achieved by the arrangement described. A great advantage of this arrangement is that the magnetic circuit approaches the minimum possible reluctance, due to the small average circumference of the flux path, and the highest possible magnetic field for a given current, due to its very close proximity to the conductors. It is extremely difficult, if not impossible to approach these conditions of minimum reluctance and minimum driving current with a core which is preformed before the linking conductors are assembled, which is the necessary procedure, for example, when the core is formed by pressing small particles and sintering.

The bistable state magnetic storage element of the present invention requires for its satisfactory operation that the thin strip, after forming into the sleeve 16 to provide a generally toroidal magnetic flux path which is linked with the magnetic fields associated with any current flow through the conductor unit, have a suitable bistable state magnetic field-magnetic flux hysteresis loop characteristic. To be suitable for that purpose this magnetic field intensity-flux density characteristic not only should be such that its retentivity value is a large fraction—usually more than half and preferably more than 0.9—of its saturation flux density, but also should be such that, when the ferromagnetic material of the sleeve is given a remanent flux density approaching its retentivity value in one sense of magnetization, this remanent flux density is not changed substantially by a substantial magnetic field intensity in the opposite sense, while an intensity not over several times that substantial field intensity—usually less than 4 or 5 times as great and preferably less than twice as great—switches the material of the sleeve to its other stable magnetic state by producing a remanence approaching the aforementioned retentivity value but in the aforesaid opposite sense.

Figure 3:
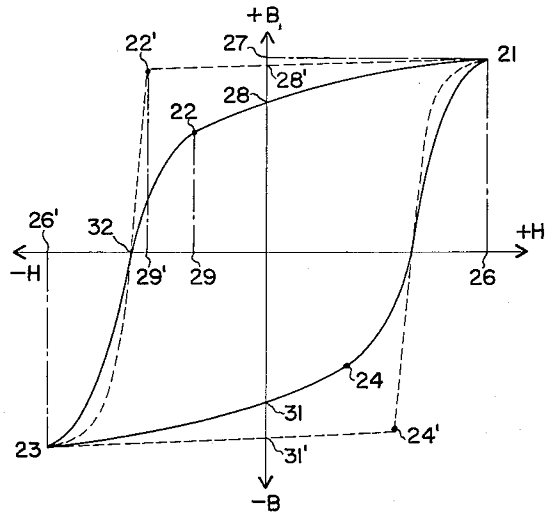
FIG. 3 is a graphical representation of a magnetic field-magnetic flux hysteresis loop characteristic such as may be found in the magnetic cores of the magnetic elements of the invention.

From the representative hysteresis loop characteristic depicted by the solid line curve in the graph of FIG. 3, it may be observed that a magnetic field-magnetic flux characteristic satisfying these requirements has two well defined, relatively flat, retensive flux-storing or stable regions 21 to 22 and 23 to 24, each preceded by a well defined, relatively steep flux-switching region 24 to 21 or 22 to 23 respectively. The hysteresis loop has the usual coordinates, with magnetic field intensities in two senses, arbitrarily designated positive and negative, along the abscissa and corresponding magnetic flux densities along the ordinate. To plot the loop the core is symmetrically cyclically magnetized, using a magnetic field having an amplitude sufficient to cause the flux to approach the saturation condition. In fact, the curves in FIG. 3 are obtained by using a maximum field intensity 26 such that the point 21 corresponds to saturation flux density 27. The point 28, where the curve crosses the vertical axis, then represents the retentivity of the core.

Now, application of a predetermined substantial magnetic field 29, in the opposite sense, does not change substantially the remanent flux density, which returns practically to the point 28 when the field 29 is removed. In other words, the portion of the loop between 28 and 22 represents a substantially reversible region in the magnetic characteristic, and variations over this region are accompanied by only negligible hysteresis losses. This will be recognized as a generally necessary condition for utilization of the magnetic elements in coincident current magnetic memory matrices. However, application of a magnetic field 26' in the negative sense, having the same magnitude as the positive field 26, produces saturation of the flux density in the negative sense, after which the flux density returns to its negative retentivity value 31. As the negative magnetic field is applied, the material passes through the zero flux condition 32, representing the coercivity value of the material.

A hysteresis loop characteristic of the type represented by the solid line curve in FIG. 3 may be obtained by the use of a number of magnetic materials known to the art. In the usual case it is desirable that this type of characteristic be obtained without annealing the material after it is wound into the form of the sleeve 16, because the conventional enamel or plastic insulating coating is, of course, unrefractory and incapable of resisting high temperatures. Alternatively, an inorganic, for example vitreous, insulating material may be used on platinum or other conductors capable of resisting high temperatures, permitting annealing the wound sleeve at high temperatures.

A characteristic of the type represented approximately by the solid curve in FIG. 3 may be obtained, for example, with an unannealed iron material containing 5% silicon. It will be observed that the retentivity value 28 is a large fraction, and more specifically more than half, of the saturation flux density 27, and further that the application of the substantial field intensity 29 in the reverse sense does not change substantially the remanent flux density, which returns substantially to its retentivity value 28, while an intensity 26' which is equal in magnitude to the positive field intensity 26 and sufficient to saturate in the negative sense is not more than several times the intensity 29, and more specifically is less than 4 or 5 times the value 29.

Ordinarily, considerably more rectangular hysteresis loops are available than that of the solid line curve in FIG. 3, although the latter will provide satisfactory operation in certain coincident current memory systems. A material preferred for incorporation in the magnetic elements of the present invention has the approximate composition of 4% molybdenum, 79% nickel, and the balance primarily iron. This is an alloy which, when annealed after working, commonly is known as a Permalloy. However, for these elements it is not necessary that the material be annealed after the rather heavy rolling operation which provides the thin strip. It is remarkable that this alloy composition provides a highly rectangular hysteresis loop, as indicated by the dashed line curve in FIG. 3, even though not annealed after the strip has been prestressed with the production of unrelieved internal mechanical strains caused by rather drastic cold working. The unannealed condition in the present usage refers to the omission of the conventional annealing after final rolling of the strip and especially after the application of the magnetic material around a conductor unit, it being obvious to those familiar with the production of very thin rolled metallic strip that annealing nevertheless may have been resorted to after at least the initial reducing passes through a rolling mill to preserve the mechanical integrity of the strip regardless of its magnetic characteristics. Its retentivity value is indicated at 28′, and the retentive flux-storing regions 21 through 28′ to 22′ and 23 to 24′ (through the negative retentivity point 31′) are remarkably flat for an unannealed material, while the flux-switching regions following 22′ and 24′ are very steep. Thus, the retentivity value 28′ is more than 0.9 of the saturation flux density 27, while a predetermined reverse field intensity 29′ may be applied which has a magnitude more than half of the value 26′ required to approach saturation density without changing the remanent flux density substantially; a wound strip core having magnetic properties satisfying these requirements of retentivity and of the ration between reverse magnetic field intensities in the substantially reversible region and the intensity required for substantial saturation may be defined, for the purposes of the present specification and of the appended claims, as having an essentially rectangular magnetic hysteresis loop characteristic. A rectangular loop characteristic is the same as a square loop characteristic, depending only on the arbitrary choice of scales for representing the units of magnetic field strength and magnetic flux in the graphical representation of the hysteresis loop. With any of the materials mentioned it is recommended to make the strip thickness of the order of 0.001 inch or less to give the desired magnetic properties using the pulsed wave forms ordinarily encountered.

FIG. 4 shows in plan view and partly schematically an electrical circuit matrix including a plurality of magnetic element stations at coordinate positions in the matrix. This matrix is shown in its preferred form of a magnetic memory matrix arranged upon an insulating support 41, with which are associated various circuits, shown in block diagram form, for utilizing the matrix as a coincident current magnetic memory. The support 41 conveniently can be made by printed circuit techniques, starting with a laminate having, for example, a phenolic-impregnated base and a thin copper foil firmly affixed to the upper surface of the base. Much of the copper foil is removed during the etching operation to leave numerous islands 42, 43, and 44 in the central, marginal, and corner regions respectively of the support 41, as illustrated in FIG. 4. These conductive areas may be tinned by dipping in solder before assembly of the matrix, since they are to serve as areas for solder interconnections of the various magnetic elements and external wiring connections to the circuits associated with the array.

As illustrated, the array is a three by three matrix, although it will be understood that much larger matrices, such as 16 by 16 or 100 by 100, or 256 by 256, may be provided, as desired, or that the matrix might be a rectangular rather than a square array. The illustrated matrix includes nine bistable state magnetic storage elements, each similar to the element illustrated in FIGS. 1 and 2 suitable for a double coincidence read-in system with one read-out circuit.

More specifically, the matrix is made up of a network of insulated read-in and read-out conductors, gathered together at each of the nine stations of the matrix in a compact bundle of substantially straight lengths of the conductor. Thus, referring to the station in the matrix common to the upper row, which may be designated the first row, and to the left column, which may be designated the first column, there is shown schematically a read-out conductor 11 and two read-in conductors 12 and 13. Between this and the other eight bundles of substantially straight lengths of conductors the network of conductors is arranged in a configuration well known for coincident current selection, in which substantially all of the conductors in the network are common to a plurality of the stations at the coordinate positions in the matrix, the conductors being arranged between the stations so that each of a number of predetermined combinations of pairs of the read-in conductors corresponds exclusively to a different one of the nine stations in the matrix. This arrangement, interconnecting the bundles of conductors at each station or coordinate position so that each of the bundles constitutes a distinctive combination of the interconnected conductors, is achieved in most of the matrix, as illustrated in FIG. 4, by separating the conductors as they emerge from the bundles and soldering their ends to an appropriate one of the conductive islands 42, 43, or 44. Reference to FIG. 4 will show that the conductor shown to the right in each bundle, such as the conductor 12, is connected at its upper end to the island next above the station and at its lower end to the island next below the station, while the conductor shown to the left in each bundle, such as the conductor 13, is connected at its left end to the island to the left of the bundle and at its right end to the island to the right of the bundle.

An exception has been made, however, in the first column, where the connections in the upward and downward directions have been made directly between the upper and central stations and between the central and lower stations without soldering to the intervening islands. These connections are designated 45 and 46 respectively, and indicate that one wire, without joints, passes from the upper terminal island 47 to the lower terminal island 48 in the first column without a break. Using a similar technique, the conductors shown schematically as located centrally in each bundle are soldered at each end to the remaining conductive islands so as to be connected together diagonally from upper left to lower right. Again an exception has been made in that the central, or read-out, conductor in the station common to the second row and first column is connected to the corresponding conductor in the station in the third row and second column by a continuous, unbroken wire 49.

Individual magnetic cores are provided at each of the stations of this matrix, each such core having the form of a sleeve or wrapping of a flexible thin strip of ferromagnetic material wound compactly for more than one turn on the bundle of conductors constituting the station. These sleeve-shaped cores may take the form of the core 16 shown in FIGS. 1 and 2, and each core is represented schematically by dashed diagonal lines, as at the core 16 in the upper left station. If desired the wound cores may be cemented to the support 41, and soldering lugs or other connection devices may replace the conductive islands 42–44.

Various methods may be used for the fabrication of the conductor-core elements in the magnetic memory matrix illustrated in FIG. 4. The elements may be fabricated individually in the form shown in FIG. 1, each element having a plurality of, and specifically three, separated wires protruding at each end for soldering to the conductive islands, as shown at most points in the FIG. 4 matrix. The first turn of the wound core may be held to the conductor unit by cement, by slipping between two of the conductors, or simply by friction, and cement on the top turn may be advantageous to prevent unwinding.

Instead of individual fabrication of the elements several cores may be wound on certain common conductors. Considering now the elements at the three stations in the first column of the FIG. 4 matrix, the conductor 12 in the upper station extends continuously as the conductor 45 into the central station and as the conductor 46 into the lower station, emerging to pass as the conductor 51 to the terminal island 48 at the lower left. As before noted, the read-out conductor 49 also is common to two magnetic elements. Thus, the conductors 12, 45, 46, and 51 and the conductor 49 are woven together, so to speak, with the other conductors illustrated as passing through the several stations at the left of the matrix, and the core strip can be applied in the same operation around the bundles at the several stations in the first column. Accordingly, in forming the bundles in this column the continuous conductor 12—45—46—51 is stretched taut, the remaining conductors 11, 13, 49, etc. are placed alongside this stretched conductor, and the core for each station in the first column is fabricated while these conductors are held in place by a suitable fixture. By an extension of these methods it can be seen that the matrix may be built up, one or more stations at a time, by weaving the conductors and assembling the magnetic strips therearound at several stations, for example, one row at a time. When the conductors are woven together and the strips wound therearound one station at a time, starting from top to bottom of the left column and then continuing from top to bottom of each succeeding column, the array of FIG. 4 can be fabricated using continuous conductors for each column, each row, and each diagonal read-out line without ever threading or passing a magnetic strip through a closed space. Still another method is to build up the entire network of insulated conductors first with the conductors properly bundled together at each station, then to pass the individual core strips down on one side of each station and up on the other to form the sleeve at each station. It is evident that these methods can produce readily a conductor network of the desired configuration in which substantially all of the wires are continuous and unjointed in passing between the sides of the matrix.

To complete the specific read-out circuit shown by way of example in FIG. 4, external connections are made so that the diagonal connections of read-out conductors are joined together in known configuration to effect a substantial cancellation of noise signals. Starting from one terminal 52 of the read-out circuit, which is grounded, these connections are made by the conductors 53 at the right side of the matrix, 54 at the upper left of the matrix, 56 at the lower right of the matrix, and 57 at the left of the matrix, making the island 58 the ungrounded terminal of the read-out circuit. It will be appreciated that these connections alternatively might be formed by etched circuit conductors between the respective islands on the support 41.

Of course, many variations of the FIG. 4 arrangement are possible, depending on such factors as the size of the array, the method of choosing the particular station, the detailed physical structure of the components, and the physical arrangement of the components. For example, a 16 by 16 array may be divided into rows 1–8 and rows 9–16. When this is done the read-out conductors, instead of being connected diagonally, may be placed in vertical columns alongside the vertical read-in conductors. Thus a pair of conductors, side by side, would follow the pattern of the conductors 12, 45, 46, and 51, and this pair would extend together vertically through eight rows. The read-out conductor pattern for the two sets of eight rows each then might be connected such that the noise current, or vestigial signals from unswitched cores, generated in the upper half of each column flows in the opposite sense to the noise current generated in the lower half of each column. The connections also are made such that the noise current generated in the upper half of the first column flows in the opposite sense to that generated in the upper half of the second column, and this pattern is continued alternately in the succeeding columns. In this case half of each column may be constructed by stringing the continuous vertical read-in conductor and the read-out conductor side by side, placing the horizontal read-in conductors at each station, and then winding eight cores at a time, using a suitable fixture. This procedure greatly simplifies the construction of the array, since only the terminal connections for each row and column, the connections within the array along the rows only, and the connections between the upper and lower halves need be completed after the 8-core half-column units are fabricated.

To illustrate several possible arrangements of the individual magnetic elements and their fabrication individually or in groups, reference is had to the plan view of FIG. 5, illustrating a series of three elements having successive individual strip-wound cores 91, 92 and 93 wound on the wires 11, 12, and 13. Although the wires 12 and 13 have been cut at several places, their original continuity can be traced from one side of the figure to the other. The group of elements can be made from three continuous wires, or shorter lengths of some of the wires can be bundled together at each of the stations and the three cores fabricated with a single production setup. At the core stations a cross-sectional view would resemble FIG. 2. If the wire 11 were cut between the cores 91 and 92, the element on the left would be suitable for insertion individually at any of the stations in the matrix of FIG. 4; note the cross-over of the conductors 12 and 13 at the left of FIG. 5 which permits the read-in conductors to continue vertically and horizontally along their respective column and row, as seen schematically at the lower right portion of each station in the FIG. 4 matrix. One, both, or all of the wires may be cut between the cores 92 and 93, as at the dotted line 94, as required for the arrangement in which the core is to be assembled. As indicated hereinabove, when storage element selection by coincident currents in the conductor unit is not involved, the arrangement of FIG. 6 may be used, in which each individual bistable magnetic storage device has a single wire 11′ and a sleeve of a strip-shaped length of ferromagnetic material which extends continuously around the wire in wound conformation, likewise shown as a spiral 16′ of more than one turn, and which is supported by and lies contiguous to the periphery of the wire 11′.

Many circuit arrangements for utilizing the FIG. 4 array in a nine bit, coincident current memory are known to those skilled in the information storage art. An elementary type of such equipment is illustrated in block form in the lower part of FIG. 4. Horizontal switching circuits, unit 61, connect horizontal pulsing circuits, unit 62, effectively through a multi-position switching arrangement 63 in the unit 61 to each of the three rows in the array by means of respective connections 64, 66, and 67. Similarly, vertical switching circuits, unit 68, connect vertical pulsing circuits, unit 69, effectively through a multi-position switching arrangement 71 in the unit 68 to the ungrounded end of each column in the array by means of respective conductors 72, 73, and 74. An address-selecting device 76, coupled to the units 61 and 68, controls the positions of the switches 63 and 71 to choose a row and a column and thus to determine which of the nine stations in the array is chosen. A timing and read-in control circuits unit 77 is coupled to the horizontal and vertical pulsing circuits, units 62 and 69, as well as to the address-selecting device 76. A connection for input information pulse signals of either positive or negative polarity is provided from a double pole switch 78 to unit 77. The ungrounded end of the read-out circuit in the array at terminal 58 is connected to the read-out gating circuits unit 79 through a conductor 80, and the read-out connections are completed from the unit 79 through a conductor 81 to a read-out utilization device 82. The read-out gating circuits unit 79 also is under the control of the timing unit 77 by virtue of an interconnection 83.

In operation, the address-selecting device 76 determines the effective position of the switches 63 and 71 in the horizontal and vertical switching circuits 61 and 68. The timing and read-in control circuits 77 then trigger the horizontal and vertical pulsing circuits 62 and 69 to develop pulses corresponding to the information to be stored at the station of the array chosen by the switching circuits. The pulsing circuits, of course, are controlled by external connections to the unit 77, which permits pulses to be developed in the pulsing circuits only when a signal is to be recorded; such a positive pulse signal conventionally represents a binary one, while the lack of such a signal represents a binary zero. Alternatively, the external connection to the unit 77 may be made through the double pole switch 78, the lower point of which, instead of being connected to ground, is connected to a source of a negative pulse, thus simplifying the control of the units 62 and 69 to switch the chosen core through the point 23 to the stable negative point 31′, representing binary zero, as illustrated in FIG. 3.

The circuits represented in FIG. 4 are connected as if the address-selecting device 76 had selected the first row and first column, as may be determined by following the connections through the switches 63 and 71. When a binary one is to be stored in the corresponding magnetic element, the pulsing circuits 62 and 69 simultaneously develop positive pulses under the control of the unit 77, in turn controlled by the input to the switch 78. The pulse of positive current from the unit 69 passes through the switch 71 and conductors 72, 51, 46, 45, and 12 to be grounded through the terminal 47 at the ground point 84, which is common to the vertical circuits. The unit 62 similarly provides a pulse of positive current through the conductor 64 and thence from right to left along the upper or first row through the conductor 13, whence the current passes through a terminal 86 to a ground point 87 which is common to the horizontal circuits. Each of these current pulses has an amplitude somewhat greater than half that necessary to switch the direction of the residual flux in the core 16, which thus is placed in its stable positive condition 28′, corresponding to the binary numeral one, assuming the core has the characteristic represented by the dashed line curve in FIG. 3. If, now, it is desired to change the stored information to a binary zero, the switch 78 is thrown downward to provide a negative pulse. Then the current through each of the read-in conductors 12 and 13 may have a value corresponding to the field intensity 29′, so that the net intensity, which thus is double the intensity 29′, has a value greater than the saturation value 26′, whereby the core is switched to its stable condition 31′ representing the binary numeral zero. It will be understood that any of the nine magnetic elements in the matrix may be chosen by suitable positioning of the switches 63 and 71, under the control of the unit 76, at the time the read-in pulses are developed.

During a read-out period, assuming the address-selecting device 76 again chooses the first row and first column, the read-out gating circuits unit 79 under the control of the timing unit 77 is then gated open, and pulses of predetermined polarity from the pulsing circuits 62 and 69 cause the core 16 either to switch back to its binary zero state, or not to switch if it already was in that state. Thus there is developed a signal voltage which is sensed by the read-out utilization device 82, when the core is switched, to indicate that a predetermined binary number had been stored in the chosen magnetic element. Accordingly it appears that the three wires in the element at any station of the matrix, by virtue of their respective connections to the horizontal switching circuits 61, the vertical switching circuits 68, and the read-out circuits 79 and 82, serve individually as a row-selecting wire, a column-selecting wire, and a bistable-state-sensing wire, the three wires at each station constituting a distinctive combination as described hereinabove. Conventional circuit arrangements, not shown, may be provided to switch the core back to its previous state whenever the read-out pulse causes it to change from one stable state to the other, so that the reading out is not destructive.

Many alternative read-in and read-out arrangements are familiar to those skilled in the art. Coincident current arrays are not limited to double coincidence; more than two read-in conductors may be provided at each station of the array. A discussion of the various combinatorial systems possible may be found in a paper by J. A. Rajchman, "Static Magnetic Matrix Memory and Switching Circuits," RCA Review, vol. 13, No. 2, pp. 183–201 (June 1952). In every case, however, there is coupled to at least one of the conductors means for effecting magnetic saturation in the ferromagnetic material and thus for switching the material from one to the other of its alternate bistable remanent states when information is to be stored. More specifically, such means is provided for passing at a given time sufficient current through at least one conductor in the conductor unit of the magnetic element to provide in the core or ferromagnetic strip material of the wound sleeve 16 the corresponding predetermined magnetic field intensity greater than the aforementioned coercivity value in its hysteresis loop characteristic (as at point 32 in FIG. 3) and sufficient to switch the core and produce a remanence approaching the retentivity value, that is, to produce a magnetic flux approaching magnetic saturation in the sleeve.

In the arrangement illustrated in FIG. 4, this means includes the horizontal and vertical coincident current pulsing and switching circuits 61, 62 and 68, 69 under the control of the timing unit 77 and the information input channel 78. Stated differently, these pulsing and switching circuits provide circuit means connected to at least one of the conductors of a selected core in the matrix for effecting magnetic saturation of the core sleeve material, which has an essentially square magnetic hysteresis loop characteristic as explained hereinabove in connection with FIG. 3.

Alternative coincident selection arrangements are familiar. For example, individual pulsing circuits may be provided for each row and each column of the array with switching arrangements for effectively triggering the pulse generators in only the desired row and column. Attention may be called to the above-mentioned paper by Rajchman and to another paper by the same author, entitled "A Myriabit Magnetic-Core Matrix Memory," Proceedings Inst. Radio Eng., vol. 41, No. 10, pp. 1407–1421 (October 1953), for additional references and for more detailed information regarding arrangements of these types.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A coupled circuit magnetic device, comprising: an electrical conductor unit including a plurality of substantially parallel elongated conductors insulated from each other by nonconductive coatings thereon; and a strip-shaped length of ferromagnetic material which extends continuously and closely around said conductor unit for a distance substantially longer than the periphery thereof, said conductor unit where encompassed by said length of ferromagnetic material being compact and substantially free of nonconductive spaces except for any gaps made unavoidable by conductor cross-sectional shape and by said insulating coatings on the conductors, and said strip-shaped length of ferromagnetic material being supported by, and lying closely adjacent to, a substantial portion of the surface of each such insulated electrical conductor which occupies a peripheral position in said conductor unit.

2. A coupled circuit magnetic device, comprising: a plurality of elongated electrical conductors, insulated from each other by nonconductive coatings thereon, and disposed substantially straight and parallel for a portion of their lengths in a compact bundle substantially free of nonconductive spaces except for any gaps made unavoidable by conductor cross-sectional shape and by said coatings on the conductors; and a strip-shaped length of ferromagnetic material extending in wound conformation for more than one turn continuously and closely around, and directly on, said bundle of insulated conductors.

3. A coupled circuit magnetic device, comprising: a plurality of wires, each coated with a film of insulating material and suitable for connection in a separate electrical circuit, and disposed substantially straight and parallel for a portion of their lengths in a compact bundle substantially free of nonconductive spaces except for any unavoidable gaps between substantially contiguous wires and for said insulating coatings thereon; and a thin strip of ferromagnetic material, wound continuously and closely around said compact bundle of wires in a spiral of more than one turn, each turn over the preceding one, the innermost turn of said spiral-wound strip being wound directly on said bundle of conductors.

4. A coupled circuit magnetic device, comprising: a plurality of elongated electrical conductors insulated from each other by nonconductive coatings thereon and disposed substantially straight and parallel for only a portion of their lengths in a compact bundle substantially free of nonconductive spaces except for any gaps made unavoidable by conductor cross-sectional shape and by said insulating coatings on the conductors; and a sleeve of a thin strip of ferromagnetic material extending continuously and closely for more than one turn around said compact bundle of conductors, said strip being supported by, and lying closely adjacent to, a substantial portion of the surface of each such electrical conductor which occupies a peripheral position in said bundle of conductors, each of said conductors protruding from opposite end portions of said sleeve, and the corresponding ends of at least two of said mutually insulated conductors being separated and spaced apart from each other at the ends of said compact bundle and thus being available for external connection individually into a plurality of circuits.

5. A bistable state magnetic storage device, comprising: an electrical conductor unit including a plurality of substantially parallel elongated conductors insulated from each other by nonconductive coatings thereon; and a strip-shaped length of ferromagnetic material which extends continuously and closely around said conductor unit for a distance substantially longer than the periphery thereof, and which has an essentially square magnetic hysteresis loop characteristic, said conductor unit where encompassed by said length of ferromagnetic material being compact and substantially free of nonconductive spaces except for any gaps made unavoidable by conductor cross-sectional shape and by said insulating coatings on the conductors, and said strip-shaped length of ferromagnetic material being supported by, and lying closely adjacent to, a substantial portion of the surface of each such insulated electrical conductor which occupies a peripheral position in said conductor unit.

6. A bistable state magnetic storage device, comprising an electrical conductor unit including a plurality of substantially parallel elongated conductors insulated from each other by nonconductive coatings thereon; and a strip-shaped length of ferromagnetic material which extends continuously and closely in wound conformation around said conductor unit for a distance substantially longer than the periphery thereof, and which has in said wound conformation a magnetic field-magnetic flux characteristic with two well defined, relatively flat, retentive flux-storing regions, each separated by a well defined, relatively steep flux-switching region, said conductor unit where encompassed by said length of ferromagnetic material being compact and substantially free of nonconductive spaces except for any gaps made unavoidable by conductor cross-sectional shape and by said insulating coatings on the conductors, and said strip-shaped length of ferromagnetic material being supported by, and lying closely adjacent to, a substantial portion of the surface of each such insulated electrical conductor which occupies a peripheral position in said conductor unit.

7. A bistable state magnetic storage device, comprising: a plurality of elongated electrical conductors, insulated from each other by nonconductive coatings thereon, and disposed substantially straight and parallel for a portion of their lengths in a compact bundle substantially free of nonconductive spaces except for any gaps made unavoidable by conductor cross-sectional shape and by said coatings on the conductors; and a strip-shaped length of ferromagnetic material which extends in wound conformation for more than one turn continuously and closely around, and directly on, said bundle of insulated conductors, and which has in said wound conformation an essentially square magnetic hysteresis loop characteristic.

8. A bistable state magnetic storage device comprising: a plurality of elongated electrical conductors insulated from each other by nonconductive coatings thereon, and disposed substantially straight and parallel for a portion of their lengths in a compact bundle in which each insulated conductor lies throughout said portion of its length substantially in contact with the conductors nearest thereto in said bundle; and a strip-shaped length of ferromagnetic material which extends in wound conformation for more than one turn continuously and closely around, and directly on, said bundle of insulated conductors, and which has in said wound conformation an essentially square magnetic hysteresis loop characteristic.

9. A bistable state magnetic storage device, comprising: a plurality of wires, having insulating coatings thereon, and disposed substantially straight and parallel for a portion of their lengths in a compact bundle substantially free of nonconductive spaces except for any unavoidable gaps between substantially contiguous wires and for said insulating coatings thereon; and a thin strip of ferromagnetic material, wound continuously and closely for more than one turn on said compact bundle of wires, said strip being supported by, and lying closely adjacent to, a substantial portion of the surface of each such insulated wire which occupies a peripheral portion in said bundle, and the ferromagnetic material of said wound strip having an essentially square magnetic hysteresis loop characteristic.

10. A bistable state magnetic storage device, comprising: a plurality of wires, having insulating coatings thereon, and disposed substantially straight and parallel for a portion of their lengths in a compact bundle substantially free of nonconductive spaces except for any unavoidable gaps between substantially contiguous wires and for said insulating coatings thereon, and a sleeve of a thin strip of ferromagnetic material wound continuously and closely around, and directly on, said bundle of insulated wires in a spiral of more than one turn, each turn over the preceding one, said strip in said sleeve having an essentially square magnetic hysteresis loop characteristic.

11. A bistable state magnetic storage device, comprising: a plurality of elongated electrical conductors, insulated from each other by nonconductive coatings thereon, and disposed substantially straight and parallel for a portion of their lengths in a compact bundle in which each insulated conductor lies throughout said portion of its length substantially in contact with the conductors nearest thereto in said bundle; and a thin strip of unannealed alloy having the approximate composition of four percent molybdenum, seventy-nine percent nickel, and the balance primarily iron, which extends in wound conformation for more than one turn continuously and closely around and directly on, said bundle of insulated conductors.

12. A bistable state magnetic storage device, comprising: a plurality of elongated electrical conductors, insulated from each other by nonconductive coatings thereon, and disposed substantially straight and parallel for a portion of their lengths in a compact bundle substantially free of nonconductive spaces except for any gaps made unavoidable by conductor cross-sectional shape and by said coatings on the conductors; a thin strip of prestressed unannealed ferromagnetic material which extends in wound conformation for more than one turn continuously and closely around, and directly on, said bundle of insulated conductors, and which has in said wound conformation a bistable state magnetic field-magnetic flux hysteresis loop characteristic; and means for passing at a given time sufficient current through at least one of said conductors to provide in said wound strip a magnetic field intensity greater than the coercivity value in said hysteresis loop characteristic and sufficient to produce a remanent flux density closely approaching the retentivity value therein.

13. A bistable state magnetic storage device, comprising: a plurality of elongated electrical conductors, insulated from each other by nonconductive coatings thereon, and disposed substantially straight and parallel for a portion of their lengths in a compact bundle substantially free of nonconductive spaces except for any gaps made unavoidable by conductor cross-sectional shape and by said coatings on the conductors; a sleeve of a thin strip of ferromagnetic material wound continuously and closely for more than one turn around, and directly on, said bundle of insulated conductors; and means for passing at a given time sufficient current through at least one of said conductors to provide in said ferromagnetic strip material of said sleeve a corresponding magnetic field intensity high enough to produce a magnetic flux closely approaching magnetic saturation in said sleeve.

14. A bistable state magnetic storage device, comprising: an electrical conductor unit disposed substantially straight for a predetermined length and consisting within said substantially straight length of a least one conductor; a strip-shaped length of ferromagnetic material which extends continuously and closely in a wound conformation of more than one turn around said substantially straight portion of said conductor unit, and which has in said wound conformation a magnetic field-magnetic flux hysteresis loop characteristic with two well defined, relatively flat, retentive flux-storing regions, each preceded by a well defined, relatively steep flux-switching region; and means coupled to at least one of said conductors for effecting magnetic saturation in said ferromagnetic material, said conductor unit where encompassed by said length of ferromagnetic material being compact and substantially free of nonconductive spaces except for any gaps made unavoidable by conductor cross-sectional shape and by any insulating coatings thereon, and said strip-shaped length of ferromagnetic material being supported by, and lying closely adjacent to, a substantial portion of the surface of each such conductor which occupies a peripheral position in said conductor unit.

15. A bistable state magnetic storage device, comprising: an electrical conductor unit disposed substantially straight for a predetermined length and consisting within said substantially straight length of at least one flexible wire having a nonconductive coating thereon; a strip-shaped length of ferromagnetic material which extends continuously and closely around said substantially straight portion of said conductor unit for a distance substantially longer than the periphery thereof, and which has an essentially square magnetic hysteresis loop characteristic; and means coupled to at least one of said wires for effecting magnetic saturation in said ferromagnetic material, said conductor unit where encompassed by said length of ferromagnetic material being compact and substantially free of nonconductive spaces except for any unavoidable gaps between contiguous wires and for said insulating coatings thereon, and said strip-shaped length of ferromagnetic material being supported by, and lying closely adjacent to, a substantial portion of the surface of each such insulated wire which occupies a peripheral position in said conductor unit.

16. A bistable state magnetic storage device, comprising: an electrical conductor unit disposed substantially straight for a predetermined length and consisting within said substantially straight length of at least one flexible wire having an insulating coating thereon, said predetermined length of conductor unit being compact without substantial kinking of any such wire and substantially free of nonconductive spaces except for any unavoidable gaps between contiguous wires and for said insulating coatings thereon; a sleeve of a thin strip of ferromagnetic material wound continuously and closely around, and directly on, said predetermined length of conductor unit in a spiral of more than one turn, each turn over the preceding one, said strip in said wound sleeve having an essentially square magnetic hysteresis loop characteristic; and circuit means connected to at least one of said wires for effecting magnetic saturation of the material of said sleeve.

17. A bistable state magnetic storage device, comprising: an electrical conductor unit disposed substantially straight for a predetermined length and consisting within said straight length of a least one flexible wire insulated by a nonconductive coating, said predetermined length of conductor unit being compact and substantially free of kinks and of nonconductive spaces except such spaces due to any unavoidable gaps between contiguous wires and to said insulating coating; a sleeve of a thin strip of prestressed unannealed ferromagnetic material which extends in wound conformation for more than one turn continuously and closely around, and directly on, said electrical conductor unit, and which has in said wound conformation an essentially square magnetic hysteresis loop characteristic; and circuit means connected to at least one wire in said conductor unit for switching ferromagnetic material in said sleeve from one to the other of its alternate bistable remanent states when information is to be stored and for switching such material in said sleeve back to said one bistable state, said circuit means including means for developing a signal responsive to the switched state of such ferromagnetic material for indicating that information has been stored.

18. A bistable state magnetic storage device, comprising: a substantially straight length of an electrical conductor; a strip-shaped length of ferromagnetic material which extends continuously in a wound conformation around said length of conductor for a distance substantially longer than the periphery thereof, which is supported by, and lies closely adjacent to, said periphery of the portion of said length of conductor which it encompasses, and which has in said wound conformation a magnetic field-magnetic flux characteristic with two well defined, relatively flat retentive flux-storing regions, each preceded by a well defined, relatively steep flux-switching region; and means coupled to said conductor for effecting magnetic saturation in said ferromagnetic material.

19. A bistable state magnetic storage device, comprising: a substantially straight length of a flexible wire; a strip-shaped length of prestressed unannealed ferromagnetic material which extends continuously in wound conformation around said length of wire for a distance substantially longer than the periphery thereof, which is supported by, and lies contiguous to, said periphery of the portion of said length of wire which it encompasses, and which has in said wound conformation an essentially square magnetic hysteresis loop characteristic; and circuit means connected to said wire for switching ferromagnetic material in said strip-shaped length from one to the other of its alternate bistable remanent states when information is to be stored and for switching such ferromagnetic material back to said one bistable state, said circuit means including means for developing a signal responsive to the switched state of such ferromagnetic material for indicating that information has been stored.

20. An electrical circuit matrix including a plurality of magnetic element stations at coordinate positions in said matrix, comprising: a network of electrical conductors, mutually insulated by nonconductive coatings thereon, certain ones of which are gathered together at the stations of said matrix in compact bundles wherein said certain conductors are disposed substantially straight and parallel and substantially free of nonconductive spaces except for any gaps made unavoidable by conductor cross-sectional shape and by said insulating coatings on the conductors, substantially all of the conductors in said network being common to a plurality of said stations and being arranged therebetween so that said bundles are made up of a multiplicity of different predetermined combinations of conductors corresponding to individual ones of said stations; and a magnetic core surrounding each of said bundles of conductors to provide the individual magnetic elements at the several stations of said matrix, each such core being a wrapping of a flexible strip of ferromagnetic material extending continuously and closely for more than one turn around the bundle of conductors constituting the respective one of said stations, said strip in each such wrapping being supported by, and lying closely adjacent to, a substantial portion of the surface of each conductor which occupies a peripheral position in the respective bundle of conductors.

21. A magnetic memory matrix, comprising: a network of elongated electrical conductors gathered together in compact bundles at the coordinate positions in the matrix, the conductors in each of said bundles constituting a distinctive combination, being insulated from each other by nonconductive coatings on the conductors, and being disposed substantially straight and parallel and substantially free of nonconductive spaces within the bundle except for any gaps made unavoidable by conductor cross-sectional shape and by said insulating coatings on the conductors; and for each of said bundles of conductors an individual, strip-shaped length of ferromagnetic material which extends in wound conformation for more than one turn continuously and closely around, and directly on, the respective bundle and which has in said wound conformation a bistable state hysteresis loop characteristic.

22. A magnetic memory matrix, comprising: a network of elongated electrical conductors gathered together in compact bundles at the coordinate positions in the matrix, the conductors in each of said bundles constituting a distinctive combination, being insulated from each other by nonconductive coatings on the conductors, and being disposed substantially straight and parallel and substantially free of nonconductive spaces within the bundle except for any gaps made unavoidable by conductor cross-sectional shape and by said insulating coatings on the conductors; and an individual wrapping of a flexible strip of unannealed ferromagnetic material less than about one thousandth of an inch thick extending for more than one turn continuously and closely around, and directly on, each of said bundles of conductors, the ferromagnetic material in each of said wrappings having an essentially rectangular magnetic field-magnetic flux characteristic with two well defined, relatively flat, retentive flux-storing regions, each preceded by a well defined, relatively steep flux-switching region.

23. A magnetic memory matrix, comprising: a network of flexible wires, mutually insulated by coatings thereon of material incapable of resisting high temperatures, and gathered together in compact bundles at the coordinate positions in the matrix, the wires in each of said bundles constituting a distinctive combination and being disposed substantially straight and parallel and substantially free of nonconductive spaces within the bundle except for any unavoidable gaps between contiguous wires and for said insulating coatings thereon; and an individual sleeve of a flexible strip of unannealed ferromagnetic material less than about one thousandth of an inch thick wound continuously and closely around, and directly on, each of said bundles of insulated wires in a spiral of more than one turn, each turn over the preceding one, said strip in each of said sleeves having an essentially square magnetic hysteresis loop characteristic.

24. A magnetic memory matrix including a plurality of magnetic storage element stations at coordinate positions in said matrix, comprising: a network of flexible wires, mutually insulated by coatings thereon of material incapable of resisting high temperatures, certain ones of which are gathered together in compact bundles of substantially straight and parallel lengths at the stations of said matrix, said bundles being substantially free of nonconductive spaces except for any unavoidable gaps between contiguous wires and for said insulating coatings thereon, and substantially all of said wires being continuous and unjointed in passing between the sides of said matrix and being common to a plurality of stations and arranged therebetween so that said bundles are made up of a multiplicity of different predetermined combinations of wires corresponding to individual stations of said matrix; and an individual wrapping of a prestressed unannealed strip of ferromagnetic material, of the order of one eight-thousandth of an inch thick, extending for more than one turn continuously and closely around, and directly on, each of said bundles of wires, said ferromagnetic material being permalloy alloy containing about seventy nine percent nickel and about four percent molybdenum.

25. A magnetic memory matrix, comprising: a network of flexible wires having insulating coatings thereon and gathered together in compact bundles at the coordinate positions in the matrix, each of said bundles including a row-selecting wire, a column-selecting wire, and a bistable-state-sensing wire in a distinctive combination, and the wires in each of said bundles being disposed substantially straight and parallel and substantially free of nonconductive spaces within the bundles except for any unavoidable gaps between substantially contiguous wires and for said insulating coatings thereon; and an individual sleeve of a thin strip of ferromagnetic material wound continuously and closely around, and directly on, each of said bundles of insulated wires in a spiral of more than one turn, each turn over the preceding one, said strip in each of said sleeves having an essentially square magnetic hysteresis loop characteristic.

References Cited in the file of this patent

UNITED STATES PATENTS

| | | |
|---|---|---|
| 1,912,442 | Gilbert | June 6, 1933 |
| 2,041,147 | Preisach | May 19, 1936 |
| 2,042,530 | Jacobs | June 2, 1936 |

(Other references on following page)

UNITED STATES PATENTS

| | | |
|---|---|---|
| 2,671,950 | Sukacev | Mar. 16, 1954 |
| 2,691,156 | Saltz et al. | Oct. 5, 1954 |
| 2,700,150 | Wales | Jan. 18, 1955 |
| 2,716,268 | Steigerwalt | Aug. 30, 1955 |
| 2,778,005 | Allen | Jan. 15, 1957 |
| 2,792,563 | Rajchman | May 14, 1957 |
| 2,877,540 | Austen | Mar. 17, 1959 |
| 2,878,463 | Austen | Mar. 17, 1959 |

| | | |
|---|---|---|
| 2,914,840 | Damiano | Dec. 1, 1959 |
| 2,925,962 | Hebeler | Feb. 23, 1960 |

OTHER REFERENCES

"Nondestructive Sensing of Magnetic Cores," by D. A. Buck and W. I. Frank, from Communications and Electronics, pp. 822–830, January 1954.

"A New Nondestructive Read for Magnetic Cores," by R. Thorenson and W. R. Arsenault, published in the "1955 Western Joint Computer Conference," August 1955, pp. 111 to 116, FIG. 2B specifically relied upon.